United States Patent
Tran et al.

(10) Patent No.: US 8,836,411 B2
(45) Date of Patent: Sep. 16, 2014

(54) CHARGE PUMP SYSTEMS AND METHODS

(71) Applicant: Silicon Storage Technology, Inc., San Jose, CA (US)

(72) Inventors: Hieu Van Tran, San Jose, CA (US); Sang Thanh Nguyen, Union City, CA (US); Nasrin Jaffari, Sunnyvale, CA (US); Hung Quoc Nguyen, Fremont, CA (US); Anh Ly, San Jose, CA (US)

(73) Assignee: Silicon Storage Technology, Inc., San Jose, CA (US)

( * ) Notice: Subject to any disclaimer, the term of this patent is extended or adjusted under 35 U.S.C. 154(b) by 0 days.

(21) Appl. No.: 13/726,522

(22) Filed: Dec. 24, 2012

(65) Prior Publication Data

US 2013/0187707 A1    Jul. 25, 2013

Related U.S. Application Data (60) Continuation of application No. 13/070,405, filed on Mar. 23, 2011, now Pat. No. 8,339,187, which is a division of application No. 11/805,765, filed on May 23, 2007, now Pat. No. 8,232,833.

(51) Int. Cl.

| | | |
|---|---|---|
| *G05F 1/62* | (2006.01) | |
| *H02M 3/18* | (2006.01) | |
| *G05F 3/02* | (2006.01) | |
| *H02M 3/07* | (2006.01) | |
| *H02M 1/32* | (2007.01) | |

(52) U.S. Cl.
CPC ........... *G05F 3/02* (2013.01); *H02M 2001/322* (2013.01); *H02M 3/073* (2013.01)
USPC ............... 327/536; 363/60; 365/226

(58) Field of Classification Search
None
See application file for complete search history.

(56) References Cited

U.S. PATENT DOCUMENTS

| | | |
|---|---|---|
| 5,140,182 A | 8/1992 | Ichimura |
| 5,483,486 A | 1/1996 | Javanifard et al. |
| 5,734,290 A | 3/1998 | Chang et al. |
| 5,841,703 A | 11/1998 | Wojciechowski |
| 5,912,560 A * | 6/1999 | Pasternak ...................... 324/536 |
| 6,064,251 A | 5/2000 | Park |
| 6,107,864 A * | 8/2000 | Fukushima et al. .......... 327/536 |
| 6,137,344 A | 10/2000 | Miki |
| 6,151,229 A | 11/2000 | Taub et al. |
| 6,160,723 A | 12/2000 | Liu |
| 6,373,324 B2 | 4/2002 | Li et al. |
| 6,501,325 B1 * | 12/2002 | Meng ............................ 327/536 |
| 6,525,949 B1 | 2/2003 | Johnson et al. |
| 6,614,699 B2 | 9/2003 | Tanzawa |
| 6,677,806 B2 | 1/2004 | Bloch |
| 6,756,837 B2 | 6/2004 | Kawai et al. |

(Continued)

*Primary Examiner* — Lincoln Donovan
*Assistant Examiner* — Terry L Englund
(74) *Attorney, Agent, or Firm* — DLA Piper LLP (US)

(57) ABSTRACT

Digital multilevel memory systems and methods include a charge pump for generating regulated high voltages for various memory operations. The charge pump may include a plurality of pump stages. Aspects of exemplary systems may include charge pumps that performs orderly charging and discharging at low voltage operation conditions. Additional aspects may include features that enable state by state pumping, for example, circuitry that avoids cascaded short circuits among pump stages. Each pump stage may also include circuitry that discharges its nodes, such as via self-discharge through associated pump interconnection(s). Further aspects may also include features that: assist power-up in the various pump stages, double voltage, shift high voltage levels, provide anti-parallel circuit configurations, and/or enable buffering or precharging features, such as self-buffering and self-precharging circuitry.

20 Claims, 11 Drawing Sheets

(56) References Cited

U.S. PATENT DOCUMENTS

| | | |
|---|---|---|
| 6,914,791 B1 | 7/2005 | Park et al. |
| 6,992,522 B2 | 1/2006 | Ido |
| 7,034,601 B2 | 4/2006 | Carmina et al. |
| 7,061,295 B2 | 6/2006 | Saiki et al. |
| 7,113,023 B2 | 9/2006 | Cernea |
| 7,123,077 B2 * | 10/2006 | Chiu et al. .................. 327/536 |
| 7,176,746 B1 | 2/2007 | Wang et al. |
| 7,215,179 B2 | 5/2007 | Yamazoe et al. |
| 7,224,206 B2 * | 5/2007 | Pappalardo et al. ......... 327/536 |
| 7,323,926 B2 | 1/2008 | Chen et al. |
| 7,595,682 B2 | 9/2009 | Lin et al. |
| 7,595,683 B1 * | 9/2009 | Floyd ........................... 327/536 |
| 7,679,429 B2 | 3/2010 | Nakamura |

* cited by examiner

CHARGE PUMP SYSTEMS AND METHODS

CROSS REFERENCE TO RELATED APPLICATION(S)

This is a continuation of application Ser. No. 13/070,405, filed Mar. 23, 2011, published as US2011/0169558A, now U.S. Pat. No. 8,339,187, which is a division of application Ser. No. 11/805,765, filed May 23, 2007, now U.S. Pat. No. 8,232,833, all of which are incorporated herein by reference in entirety.

BACKGROUND

1. Field

The present invention relates to charge pumping, and more particularly to charge pump systems, methods and circuitry related to multilevel flash memory systems.

2. Description of Related Information

Conventional mixed mode integrated circuit systems frequently use different voltage supplies. Additionally, some aspects of analog signal processing, such as amplification, comparison, and pulse generation, may further require performance at higher voltages. In flash memories, erase, programming, and read signals are required for operation of memory cells. These erase, programming, and read signals often require voltage levels greater than a supply voltage. For example, an erase signal of 12-15 volts may be required from a supply voltage of 3 volts. Charge pumps may be used to generate the erase signal, the programming signal, and the read signal at the higher voltage levels. Also in multilevel volatile memories, the variation of the voltage level of the signal falls in a smaller range for the multibit signals stored in the memory cells.

Furthermore, many existing charge pumps include pump stages that are not sufficiently isolated from deleterious effect of neighboring pump stages. Thus, in sum, there is a need for charge pumps having fast rise time, efficient charge pumping, and/or that have pump stages capable of maintain signal levels and/or states even when adjacent or associated stages discharge, for example, to low level.

SUMMARY

Charge pumping systems and methods may include a charge pump having a plurality of pump stages. The charge pump includes an output for providing a stable voltage signal. Aspects related to the charge pumping innovations set forth herein may include circuitry that allows for orderly charging and discharging. According to further aspects, the charge pump system may include a charge pump that performs orderly charging and discharging at low voltage operation conditions.

According to additional aspects, the present innovations may include features that enable state by state pumping, for example, circuitry that avoids cascaded short circuits among pump stages, or circuitry that discharges pump stage nodes, such as via self-discharge through associated pump interconnection(s). Further aspects may also include features that: assist power-up in the various pump stages, double voltage, shift high voltage levels, provide anti-parallel circuit configurations, and/or enable buffering or precharging features, such as self-buffering and self-precharging circuitry.

DETAILED DESCRIPTION

Digital multilevel bit memory array systems and methods include a charge pump that includes multiple successive pump stages and may include an open loop series fast voltage regulator that can be used to pump the word-line voltage during memory operations, such as read, program or erase. Charge pumps consistent with the innovations herein provide improved operation due to various circuitry within or associated with one or more of the pump stages.

Figure 1:
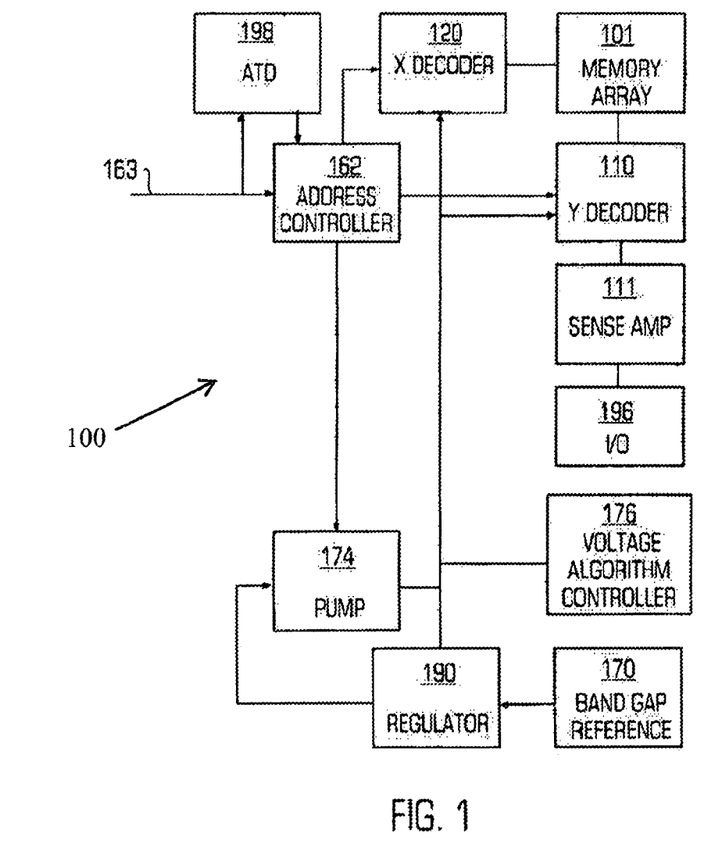
FIG. 1 is a block diagram illustrating a digital multilevel memory system consistent with one or more aspects related to the innovations herein.

FIG. 1 is a block diagram illustrating a digital multilevel bit memory array system 100 consistent with one or more aspects related to the innovations herein.

The digital multilevel bit memory array system 100 includes a memory array 101 that includes a plurality of memory cells (not shown). An N-bit digital multilevel cell is defined as a memory cell capable of storing the $2^N$ levels. The memory array 101 may include reference memory cells for storing reference voltage values for multilevel memory cell operation and verification. Alternately, the reference memory cells may be stored in a separate reference memory array.

According to certain aspects, the memory array 101 includes a source side injection flash technology, which uses lower power in hot electron programming, and efficient injector based Fowler-Nordheim tunneling erasure. The programming may be done by applying a high voltage on the source of the memory cell, a bias voltage on the control gate of the memory cell, and a bias current on the drain of the memory cell. The programming in effect places electrons on the floating gate of memory cell. The erase is done by applying a high voltage on the control gate of the memory cell and a low voltage on the source and/or drain of the memory cell. The erase in effect removes electrons from the floating gate of memory cell. The verify (sensing or reading) is done by placing the memory cell in a voltage mode sensing, e.g., a bias voltage on the source, a bias voltage on the gate, a bias current coupled from the drain (bitline) to a low bias voltage such as ground, and the voltage on the drain is the readout cell voltage $V_{CELL}$. The bias current may be independent of the data stored in the memory cell. In another embodiment, the verify (sensing or reading) is done by placing the memory cell in a current mode sensing, e.g., a low voltage on the source, a bias voltage on the gate, a load (resistor or transistor) coupled to the drain (bitline) from a high voltage supply, and the voltage on the load is the readout voltage. In one embodiment, the array architecture and operating methods may be the ones disclosed in U.S. Pat. No. 6,282,145, entitled "Array Architecture and Operating Methods for Digital Multilevel Nonvolatile Memory Integrated Circuit System" by Tran et al., the subject matter of which is incorporated herein by reference.

The multilevel memory cells of the memory array 101 may be arranged in various ways, such as in rows and columns or in segments. Various addressing schemes may be used which organize the memory cells into bytes, pages or other arrangements.

The digital multilevel bit memory array system 100 further includes an x decoder 120, a y decoder 110, an address controller 162, a sense amplifier circuit 111, and an input/output interface 196. The y decoder 110 controls bitlines (not shown) coupled to columns in memory cells, during a write, read, and array operations. The sense amplifier 111 senses the read data which is provided to the I/O interface 196. The I/O interface 196 also buffers input into the memory array system 100.

In response to an address signal 163 and other control signals (not shown), the address controller 162 decodes the address 163 and controls page, byte, segment or other addressing for the x decoder 120 and the y decoder 110.

The x decoder 120 selects a row or a block of rows in the array 101 based on the signals from the address controller 162 and provides precise multilevel bias values over temperature, process, and power supply used for consistent single level or multilevel memory operation for the memory array 101.

The digital multilevel bit memory array system 100 further includes a band gap voltage generator 170, a charge pump 174, a voltage algorithm controller 176, a voltage supply and regulator 190, and an address transition detector 198. The voltage algorithm controller 176 provides various specifically shaped voltage signals of amplitude and duration used for multilevel nonvolatile operation and to provide precise voltage values with tight tolerance, used for precision multilevel programming, erasing, and sensing. The band gap voltage generator 170 provides a precise voltage bias value over process, temperature, and supply for multilevel programming, erasing, and sensing. The charge pump 174 is used to provide a voltage supply for multilevel programming, erasing, and sensing. The charge pump 174 may include a dithering pumping clock or a spread spectrum pumping clock. The voltage supply and regulator 190 provides regulated voltage values above or below the external power supply used for erase, program, read, and production tests. The address transition detector 198 provides a signal to the address controller 162 in response to a transition of the address provided to the x decoder 120 or the y decoder 110. The address controller 162 may control the charge pump 174 to time the pumping based on an address transition.

The system 100 may execute various operations on the memory array 101. An erase operation may be done to erase all selected multilevel cells by removing the charge on selected memory cells according to the operating requirements of the non-volatile memory technology used. A data load operation may be used to load in a plurality of bytes of data to be programmed into the memory cells, e.g., 0 to 512 bytes in a page. A read operation may be done to read out in parallel a plurality of bytes of data if the data (digital bits), e.g., 512 bytes within a page, stored in the multilevel cells. A program operation may be done to store in parallel a plurality of bytes of data in (digital bits) into the multilevel cells by placing an appropriate charge on selected multilevel cells depending on the operating requirements of the non-volatile memory technology used. The operations on the memory may be, for example, the operations described in U.S. Pat. No. 6,282,145, incorporated herein by reference above.

Figure 2:
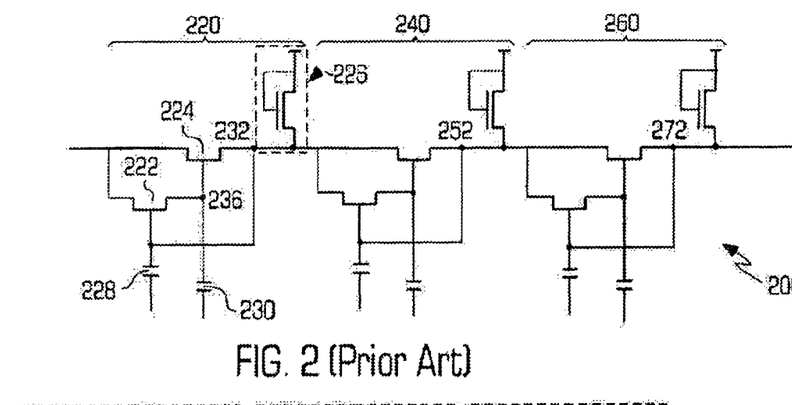
FIG. 2 is a schematic diagram illustrating a digital multilevel memory system of the prior art.

FIG. 2 is a schematic diagram illustrating a known charge pump circuit 200.

This charge pump circuit 200 may be used in some instances as the charge pump 174 in FIG. 1. The known charge pump 200 comprises a plurality of pump stages 220, 240, 260, with each pump stage including a plurality of transistors 222, 224, an output node 232, an internal node 236, and a plurality of capacitors 228, 230. Each pump stage 220, 240, 260 includes an output node 232, 252, 272 that is typically pumped to an increasingly higher voltage level. Precharge circuitry 226 may also be associated with each pump stage/output node. Pump stages 220, 240, 260, then, are cascaded to achieve a desired high voltage at the output node of the final pump stage. The charge pump circuit 200 of FIG. 2, however, suffers disadvantages such as aspects of each pump stage being interdependent upon neighboring pump stages. For example, the pump stages 220, 240, 260 of FIG. 2 are not insulated from deleterious effects of neighboring pump stages and fail to provide state by state pumping. As such, if any of the output nodes 232, 252, 272 of the charge pump circuit 200 go to zero, the other pump stages will short all the way across and/or otherwise fail to provide stable output signals. Additionally, many such systems implement circuits such as precharge circuit 226, which may suffer drawbacks, for example when VDD is too low, e.g, 1.3V, the nodes 232, 252, 272 are precharged at a low voltage VDD–$V_T$ (threshold voltage of NMOS, e.g., 1V) such that the stages fail to pump properly. Various circuitry and interconnections between pump stages may be employed to resolve such disadvantages.

Figure 3:
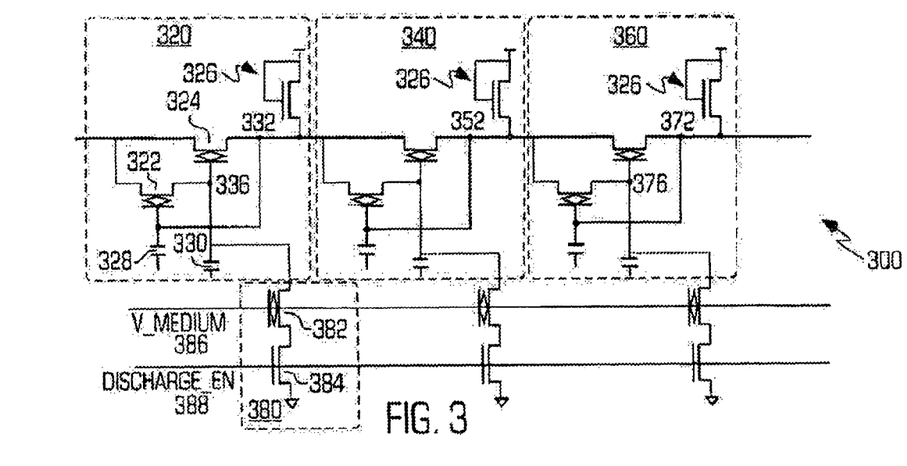
FIG. 3 is a schematic diagram illustrating a charge pump consistent with one or more aspects related to the innovations herein.

FIG. 3 is a schematic diagram illustrating a charge pump consistent with one or more aspects related to the innovations herein. The charge pump 300 may include pump stages 320, 340, 360 and discharge circuitry 380.

In general, the charge pump 300 of FIG. 3 is configured to provide a voltage at a final output stage that is greater than its supply voltage. As illustrated, the charge pump 300 comprises a plurality of pump stages 320, 340, 360 and discharge circuitry 380 that may be associated with each pump stage. The charge pump 300 may also include precharge circuitry 326 associated with one or more of the output nodes 332, 352, 372. Each pump stage may include a plurality of transistors 322, 324, which may be, for example, metal-oxide semiconductor transistors such as native NMOS transistors (i.e., with threshold voltages close to zero), as well as one or more capacitors 328, 330. Each pump stage also includes at least an output node 332, 352, 372 and another node 336, 356, 376 in addition to input or other nodes (not labeled). The charge pump provides an increased high voltage via charge pumping from the plurality of pump stages 320, 340, 360. According to some aspects, an input of one pump stage 340 may be coupled to an output node 332 of the previous pump stage 320. According to further aspects, the node to which this input is connected may be the drain of a transistor 324 located within the previous pump stage 320. Other pump stages 360 may be coupled in a similar fashion. Although three pump stages 320, 340, 360 are shown in FIG. 3, other quantities of pump stages may be used progressively along the pump chain.

The charge pump 300 may include a discharge circuit 380 associated with one or more of the pump stages 320, 340, 360. Each discharge circuit 380 may include, for example, an native NMOS transistor 382 as well as another NMOS transistor 384, in addition to a voltage supply 386 and a discharge signal line 388. As explained above, each pump stage has a specified breakdown voltage parameter (e.g., a gated diode breakdown level, etc.) such as one that is set via a transistor having its gate biased at voltage level to prevent gated diode breakdown condition. Gated diode breakdown conditions may refer to, for example, the condition in which an NMOS transistor's gate is at ground, its source is at ground, and its drain is at a voltage that the drain junction breaks down (e.g., drawing large amount of current that could burn the junction or gate oxide if the current is too large). According to some aspects of the present innovations, the discharge circuit 380 is configured to be biased at a voltage level to prevent such gated diode breakdown. Here, as a native NMOS has a higher breakdown voltage than a regular NMOS, it may be used to buffer the high voltage pumped nodes. For example, the native NMOS transistor 382 may have its gate biased to a gated breakdown voltage level, $B_{V_{DD}}$, set in association with node and other voltages to prevent gated diode breakdown. In this regard, the discharge circuit may be supplied with a voltage intermediate to the voltage level of the output node to maintain the various states required to discharge the relevant pump stage. Thus, the discharge circuit supply voltage 386 may be set at a intermediate voltage level, as compared to the voltage required on its associated pump stage, so as to provide a voltage level sufficient to adequately discharge the node when a discharge enable signal 388 is triggered. Such discharge providing protection to adjacent nodes when an interfering low pump stage condition might otherwise exist. For example, upon provision of a discharge signal, the discharge circuit discharges the pump stage via a node to prevent shorting the output node to output nodes of adjacent stages. A discharge circuit such as this may be enabled, for example, after the output nodes 332, 352, 372 have been discharged to a low level.

According to further aspects, the pump stages 320, 340, 360 may be used to pump up or discharge the voltage on the output nodes 332, 352, 372 in an orderly manner. In some aspects, the stages may be pumped from left to right as shown in FIG. 3, with the stage closest to the supply voltage typically being pumped first. For example, the stage closest to the supply voltage may be enabled first, with successive stages being enabled progressively from left to right, i.e., by enabling the capacitors by enabling clocks driving them. With regard to orderly discharge, the final pump stage output may be brought to a low level first, such as by discharge via a global discharge circuit (not shown), followed by discharge of the adjacent pump stage (such as the node 352 through transistor, with its gate 376 still at a high voltage), down to the final pump stage closest to the supply voltage. As such, the discharge circuit 380 may be enabled successively (e.g., with separate control signal 388 or some delay between circuits 380) to discharge the nodes 376, 356, 336. The charge pump 300 may be thusly controlled in an orderly fashion to generate and/or maintain the high voltage on the final output node, such as node 372.

Operation may also be assisted via a precharge circuit 326 connected to one or more of the pump stages 320, 340, 360. Thus, at the initial period of pumping, the precharge circuitry 326 may pre-charge an output node 332, 352, 372 up to the supply voltage less any associated transistor threshold voltage(s).

Figure 4A:
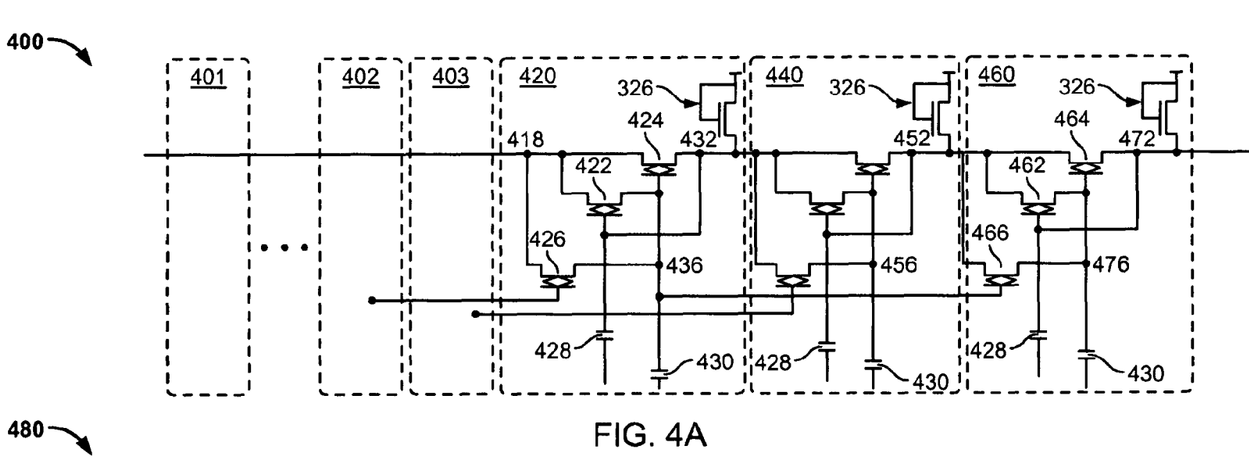
FIG. 4A is a schematic diagram illustrating a charge pump consistent with one or more aspects related to the innovations herein.

FIG. 4A is a schematic diagram illustrating a charge pump consistent with one or more aspects related to the innovations herein. The charge pump 400 may include pump stages 420, 440, 460 having electrical connections, such as self-biased discharge couplings, therebetween.

The charge pump 400 of FIG. 4A is comprised of a plurality of pump stages 420, 440, 460, each having an associated output node 432, 452, 472. As seen in one exemplary pump stage 460, each stage may comprise a plurality of transistors 462, 464, 466 and a plurality of capacitors 428, 430. Precharge circuitry 326 may also be coupled to one or more of the output nodes associated with the pump stages. As shown in FIG. 4A, each pump stage may include three or more transistors 462, 464, 466, which may be, for example, metal-oxide semiconductor transistors such as native NMOS transistors. In addition to an output node 432, 452, 472, each pump stage also includes another node 436, 456, 476 in addition to input or other nodes (not labeled). In the exemplary circuit of FIG. 4A, a pump stage 420 may include three transistors 422, 424, 426 coupled between an input node and an other node 436, a first transistor 424 with a source/drain coupled to the input node 418 and its gate coupled to the other node 436, and two additional transistors 422, 426 with sources/drains coupled to the input node 418 and their complementary drains/sources coupled to the other node. The other source/drain of this first transistor, transistor 424, may be coupled to the output node 432. Further, the gate of one of these two latter transistors, such as transistor 422, may also be coupled to the output node 432. One transistor 424 of each exemplary stage 420 may be thought of as the main charge pumping transistor that allows transfer of pumping charge from the input 418 to the output 432 of the stage 420. Another transistor 422 may be a $V_T$ cancellation transistor that, for example, cancels the $V_T$ of the transistor 424 in the forward pumping action by precharging the gate of the transistor 424 (the node 436) before the capacitor 430 couples the charge into the node 436 via the capacitance coupling action. The function of another transistor 466 and its counterpart in stages 440 and 420 may be to discharge the nodes 476, 456, 436 in an orderly fashion from right to left in FIG. 4A. For example, first the node 472 is discharged by a global discharge circuit (not shown); then, as this node 472 discharging towards a low level, another node 452 may also be discharged low through the transistor 464 since its gate 476 is still at a high level. As the node 452 discharges towards a low level, the node 476 is discharged to a low level through the transistor 466, since the gate of the transistor 466 is controlled by the node 436 which is two stages before the stage 460 that has not discharged yet. The discharging sequence may repeat in the same or similar fashion for previous stages (such as nodes 452, 432, 456 discharged in orderly progression in stage 440). Accordingly, the discharging sequence happens in an orderly fashion for the nodes within a stage and in an orderly fashion between the stages. Since the discharge is controlled by the nodes within the pump, this represents a self-biased discharge coupling (unlike in FIG. 3 the discharge circuit 380 is controlled by the nodes external to the pump).

In a feature of the innovations herein shown for purpose of example in FIG. 4A, one such transistor may be coupled to a different stage to provide a reference voltage. For example, a transistor 466 in the third stage 460 may be connected to a node of a different stage 420, 440 to obtain a reference voltage used to discharge the third stage 460. This reference voltage transistor may be connected, for example, to a pump stage that is either one or two (or more) stages earlier, or one or two (or more) stages after. This reference voltage transistor may also be connected, for example, to various specified nodes within the different stage, such as the node discussed above. According to the exemplary aspect illustrated in FIG. 4A, the reference voltage transistor 466 may be coupled to an other node 436 of a pump stage 420 two stages earlier. Although three pump stages 420, 440, 460 are detailed in FIG. 4A, other numbers of pump stages may be used progressively along the pump chain. For example, the illustrated charge pump 400 may include an initial stage 401 as well as one or more other stages 402, 403, which are prior to the stage 420 shown in more detail in FIG. 4A, such other stages having nodes to which the gates of transistors such as transistor 426 are coupled. (Here, e.g., if stage 420 is denoted stage "N", such other stages would be referred to as stage "N−1" 403, and stage "N−2" 402.) Such earlier stages are also shown in FIGS. 4B, 6, 7 and 8. Further, other stages either may be similarly connected or may use other configurations, including but not limited to the circuits and interconnections set forth throughout this disclosure.

Figure 4B:
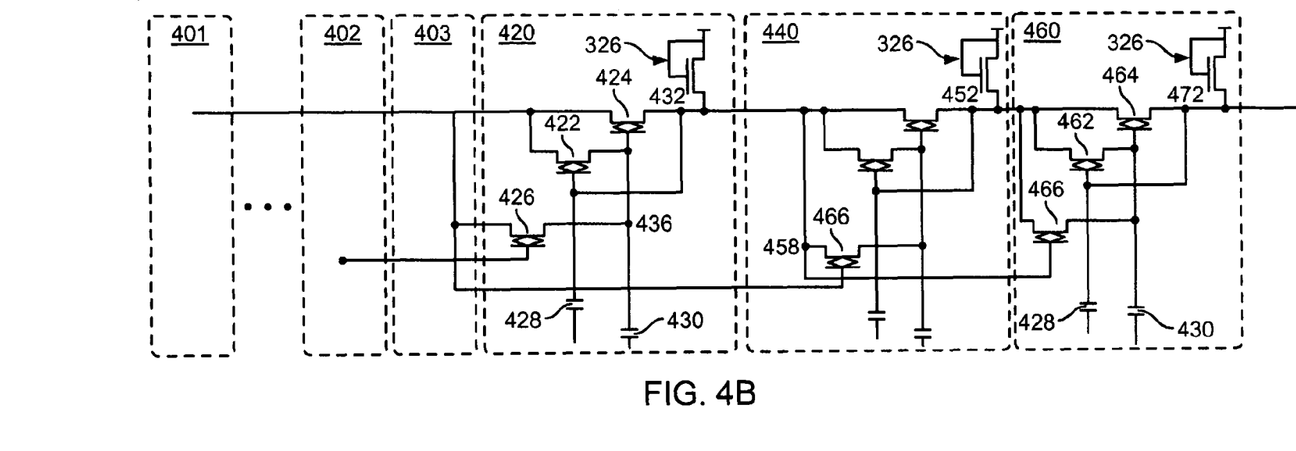
FIG. 4B is a schematic diagram illustrating a charge pump consistent with one or more aspects related to the innovations herein.

FIG. 4B is a schematic diagram illustrating a charge pump consistent with one or more aspects related to the innovations herein. As with FIG. 4A, the charge pump 480 of FIG. 4B may include pump stages 420, 440, 460 having electrical connections, such as self-biased discharge couplings, therebetween.

As with the previous charge pump 400, charge pump 480 may include an exemplary pump stage 460 comprising a plurality of transistors 462, 464, 466 and a plurality of capacitors 428, 430. Precharge circuitry 326 may also be coupled to one or more of the output nodes associated with the pump stages. As shown in FIG. 4B, such representative pump stage may include three or more transistors 462, 464, 466, which may be, for example, metal-oxide semiconductor transistors such as the native NMOS transistors described above. Charge pump 480 operates much the same as the circuit of FIG. 4A, above, though having a reference voltage transistor connected to a pump stage one stage earlier. For example, reference voltage transistor 466 of the third pump stage 460 is connected to an input node 458 (e.g., which may correspond to the output node 432 of the stage 420) of an adjacent pump stage, such as the previous pump stage 440. With regard one exemplary self-discharge coupling, each such reference voltage transistor 426, 446, 466 may be an NMOS transistor having a gate connected to a drain of an NMOS transistor in the adjacent pump stage. Further, other stages either may be similarly connected or may use other configurations, including but not limited to the circuits and interconnections set forth throughout this disclosure.

Figure 5:
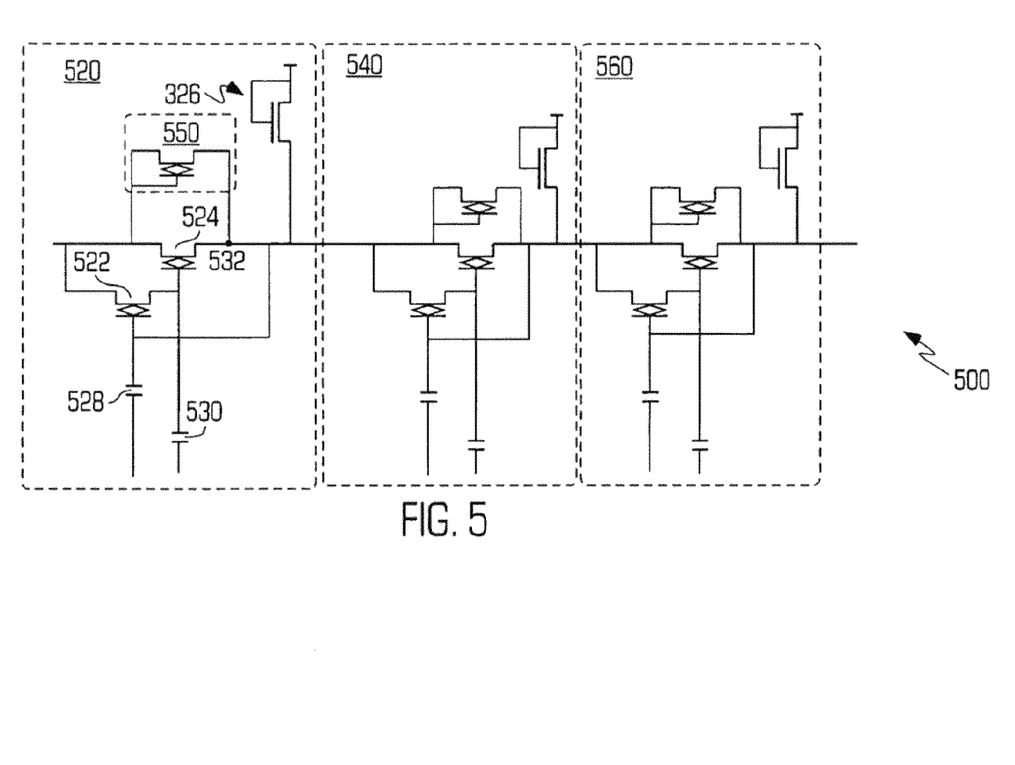
FIG. 5 is a schematic diagram illustrating a charge pump consistent with one or more aspects related to the innovations herein.

FIG. 5 is a schematic diagram illustrating a charge pump 500 consistent with one or more aspects related to the innovations herein. The charge pump 500 may include a plurality of pump stages, such as pump stage 520, and boost circuitry 550 to assist with commencing initial power-up to one or more pump stages.

The charge pump 500 of FIG. 5 is comprised of a plurality of pump stages 520, 540, 560. As with previous circuits, one or more of the pump stages 520, 540, 560 may have precharge circuitry 326 associated therewith. As seen in one exemplary pump stage 520, each stage may comprise a plurality of transistors 522, 524, which may be native NMOS transistors as set forth above, and a plurality of capacitors 528, 530. As with any of the pump stages set forth herein, exemplary pump stage 520 may include boost circuitry 550 to assist charging or powering-up its associated output node 532. Such boost circuitry 550 is added in environments when the pump stage, i.e, the gate of the transistor 524 and/or the gate of transistor 522, is at risk of getting stuck or held to an inactive voltage level. For example, the transistors 522 and 524 are not turned on to enable the forward action of charge pumping (from the input to the output of the stage). In such situations, boost circuitry 550 may be added to provide a boost to begin charging or otherwise assist activation of charge pumping at the stage in question. Specifically, exemplary boost circuitry 550 may include a diode connected transistor to change the effective threshold voltage, $V_T$, of a pump stage transistor 524, imparting forward action to boost the pump stage active. For example, vis-à-vis charging the output node 532 through the transistor 550, a node 532 may turn on another transistor 522 and, together with the charge pumping from a capacitor 528, may enable forward charge pumping action from the input node of the stage to the gate of the transistor 524. This may enable the transistor 524 and then, together with the charge pumping from the capacitor 530, may enable the complete transfer of the charge from the input to the output of the stage 520. Further, this diode-connected arrangement is configured to boost the pump stage without implication of $V_T$ cancellation and/or associated drawbacks/issues, such as the stage getting stuck at an inactive level, as explained above.

Figure 6:
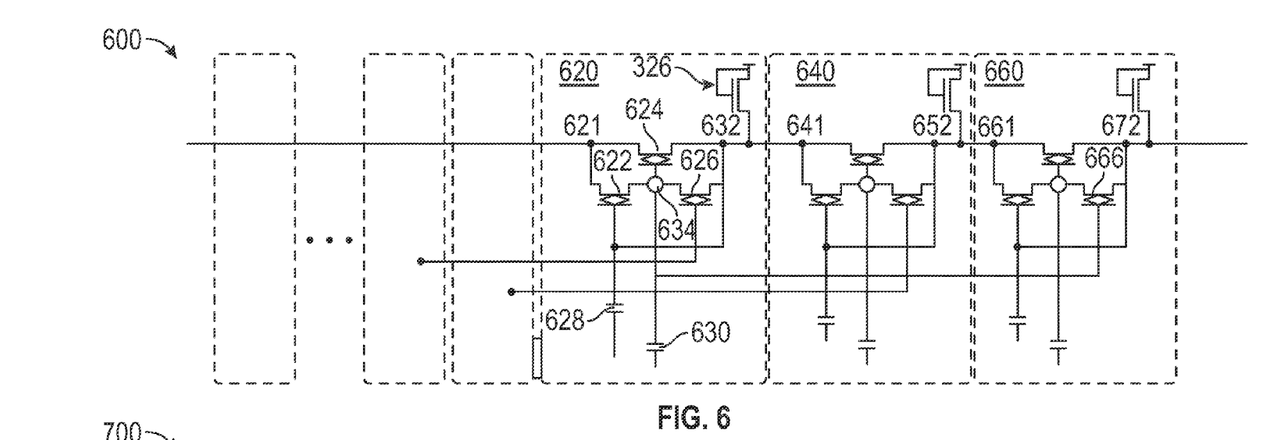
FIG. 6 is a schematic diagram illustrating a charge pump consistent with one or more aspects related to the innovations herein.

FIG. 6 is a schematic diagram illustrating a charge pump consistent with one or more aspects related to the innovations herein. The charge pump 600 of FIG. 6 may include pump stages 620, 640, 660 having electrical connections, such as self-biased discharge couplings, therebetween.

Charge pump 600 of FIG. 6 may include an exemplary or representative pump stage 620 comprising a plurality of transistors 622, 624, 626 and a plurality of capacitors 628, 630. Precharge circuitry 326 may also be coupled to one or more of the output nodes 632, 652, 672 associated with the pump stages. In addition to an output node 632, 652, 672, each pump stage also includes an input node 621, 641, 661, another node 634, 654, 674 (also referred to as the "reference node"), in addition to potentially other nodes (not labeled). As shown in FIG. 6, such representative pump stage 620 may include three or more transistors 622, 624, 626, which may be, for example, metal-oxide semiconductor transistors such as native NMOS transistors, as described above. Charge pump 600 operates similar to the circuits of FIGS. 4A and 4B, above, though having a different configuration of transistors and nodes. In addition, charge pump 600 may have a reference voltage transistor connected to another pump stage that is either one or two (or more) stages earlier, or one or two (or more) stages after. According to one aspect, a reference voltage transistor may be connected to a pump stage two stages earlier. As shown in FIG. 6, for example, a reference voltage transistor 666 of the third pump stage 660 is connected to a node of a pump stage two stages earlier, such as a reference node 634 in the first pump stage 620. Furthermore, the other stages either may be similarly connected or may use other configurations, including but not limited to the circuits and interconnections set forth throughout this disclosure.

With regard to specific exemplary circuit configurations, a pump stage 620 may include three transistors 622, 624, 626. A first transistor 622 may have its source/drain coupled between the input node 621 and the reference node 634, with its gate coupled to one or both of the output node 632 and a capacitor 628. A second transistor 626 may have its source/ drain coupled between the reference node 634 and the output node 632, with its gate coupled to another pump stage to provide a suitable voltage used to discharge the stage, i.e., a node within the pump stage, such as the reference node 634. Lastly, a third transistor 624 may have its source/drain coupled between the input node 621 and the output node 632, with its gate coupled to the reference node 634. While FIG. 6 shows reference voltage transistors, such as transistor 666, coupled to the reference node of a pump stage two stages earlier, the reference voltage transistors may be coupled, inter alia, to reference or other suitable nodes on any different stage.

Figure 7:
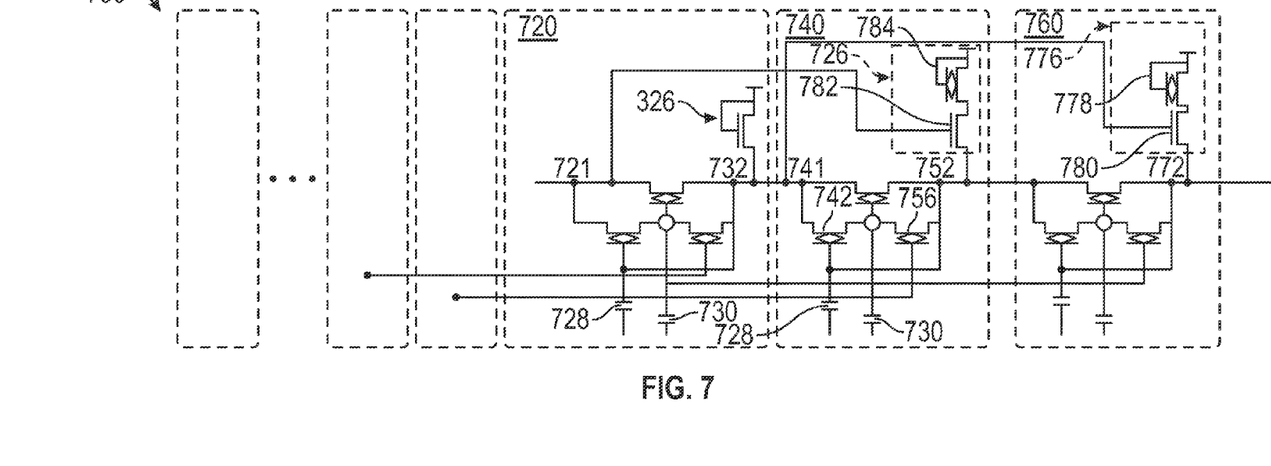
FIG. 7 is a schematic diagram illustrating a charge pump consistent with one or more aspects related to the innovations herein.

FIG. 7 is a schematic diagram illustrating a charge pump consistent with one or more aspects related to the innovations herein. The charge pump 700 of FIG. 7 may include pump stages 720, 740, 760 having electrical connections, such as self-biased couplings, therebetween configured to, for example, buffer components and/or signals on nodes such as output nodes.

Charge pump 700 of FIG. 7 may include an exemplary or representative pump stage 740 comprising a plurality of transistors 742, 756 and a plurality of capacitors 728, 730. In addition to an output node 732, 752, 772, each pump stage may also include input nodes 721, 741, and various other nodes (not labeled) as set forth, for example, throughout this disclosure. As illustrated in FIG. 7, each representative pump stage 720, 740, 760 may include transistors and capacitors such as those described above in connection with the charge pumps of FIG. 6 and/or FIGS. 3-5. Indeed, while the pump stages 720, 740, 760 shown in FIG. 7 bear resemblance to those of FIG. 6, the buffering circuitry 726 described below may be applied to any of the various pump stages set forth herein. Once again, each of the various stages either may be connected in the configuration(s) shown or it may use other configurations, including but not limited to the circuits and interconnections set forth throughout this disclosure.

With regard to buffering, the relevant buffering circuitry 726 of FIG. 7 may be coupled to one or more of the output nodes 732, 752, 772 associated with one or more of the pump stages 720, 740, 760. Exemplary buffering circuitry 726 may comprise a plurality of transistors 780, 782, including an NMOS/native NMOS transistor 784. One or more of the transistors, such as transistor 784, may also be diode connected. A transistor from the buffering circuitry 726, such as transistor 782, may also be self-biased at its gate to another signal or node from within the charge pump 700. Self-bias refers to the fact that the bias voltage is derived locally, from within the charge pump. In one exemplary aspect, a gate of the self-biased transistor 782 may be coupled to an input node 721 of a pump stage 720 one stage earlier. According to other aspects, a gate of a self-biased transistor 780 of another buffering circuit 776 may be coupled to an output node 732 of a pump stage two stages earlier or to an input node 741 of a pump stage one stage earlier. Such biased coupling are implemented to provide self-biased transistors 780, 782 that are electrically connected to another node within the charge pump 700 to buffer associated circuitry, nodes and/or desired signal levels. For example, self-biased transistors 780, 782 may buffer, respectively, adjacent transistors 778 and 784 in series such that they do not see full pumped voltages, i.e. at nodes 772 and 752, on their source junctions while their gates are at low voltage (VDD, in this case) to prevent breakdown, such as high voltage breakdown, of the adjacent transistors. The transistors 780 and 782 see full pumped voltages, i.e. at nodes 772 and 752, on their source junctions, respectively, although their gates are biased at a bias voltage proscribed by the internal coupling. Bias voltage levels, for example, higher than the voltage (VDD) on the gate of the transistors 778 and 784. Once the gates of the transistors 780 and 782 are at a coupled high voltage (e.g., pumped from previous stages), the transistors 778 and 784 act to precharge and hold the nodes 772 and 752 at a minimum voltage VDD−V.sub.TZ (V.sub.TZ=native NMOS threshold voltage, .about. 0V). This is compared to that of the circuit 326 which acts to precharge and hold a node, e.g., node 732, at a minimum voltage VDD−V.sub.TN (V.sub.TN=enhancement NMOS threshold voltage, .about. 1V). Broadly speaking, then, self-biased transistors 780, 782 are coupled to intermediate reference voltages to buffer associated circuitry 726, 776 and respective output nodes 752, 772 against the deleterious breakdown effects of adjacent circuits; inter alia, without voltage drop from enhancement NMOS threshold voltage. In connection with the nature of the bias coupling connection, the precharge may occur progressively from left to right in FIG. 7, i.e., a node 721 is pumped up to enable the precharge circuit 726, then another node 741 is pumped up to enable the precharge circuit 776.

Figure 8:
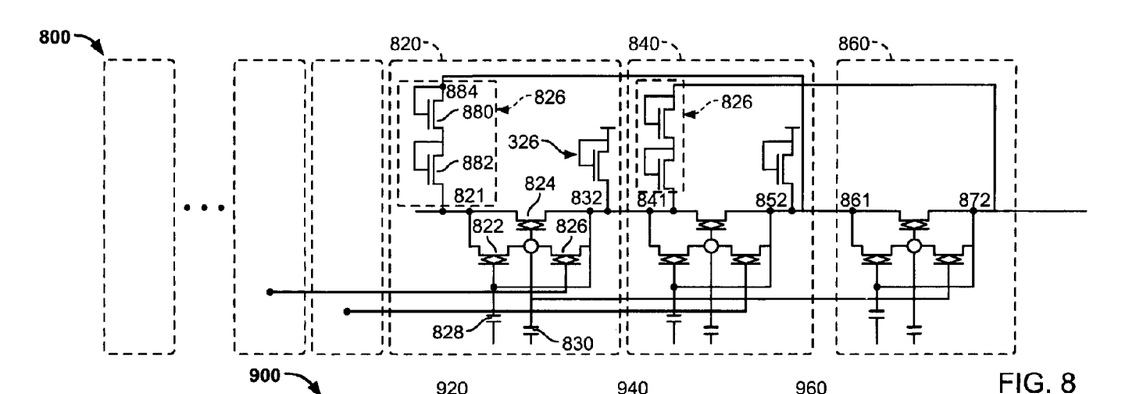
FIG. 8 is a schematic diagram illustrating a charge pump consistent with one or more aspects related to the innovations herein.

FIG. 8 is a schematic diagram illustrating a charge pump consistent with one or more aspects related to the innovations herein. The charge pump 800 of FIG. 8 may include pump stages 820, 840 with precharge circuits 826 having electrical connections, such as self-biased couplings, tied to other stages of the charge pump.

Charge pump 800 of FIG. 8 may include an exemplary or representative pump stage 820 comprising a plurality of transistors 822, 824, 826 and a plurality of capacitors 828, 830. In addition to an output node 832, 852, 872, each pump stage may also include input nodes 821, 841, 861, and various other nodes (not labeled) as set forth, for example, throughout this disclosure. As illustrated in FIG. 8, each representative pump stage 820, 840, 860 may include transistors and capacitors such as those described above in connection with the charge pumps of FIG. 6 and/or FIGS. 3-5. Indeed, while the pump stages 820, 840, 860 shown in FIG. 8 bear resemblance to those of FIG. 6, the precharging circuitry 826 described below may be applied to any of the various pump stages set forth herein. Similarly, pump stages 820, 840, 860 may include any of the components, such as discharge circuitry, shown here or set forth herein. And again, each of the various stages either may be connected in the configuration(s) shown or it may use other configurations, including but not limited to the circuits and interconnections set forth throughout this disclosure.

With regard to self-bias precharge, the precharging circuitry 826 of FIG. 8 may be coupled to one or more of the input nodes 821, 841, 861 associated with one or more of the pump stages 820, 840, 860. Exemplary precharging circuitry 826 may comprise a plurality of transistors 880, 882, such as those described above. One or more of these transistors may also be diode connected. At least one transistor from the precharging circuitry 826, such as transistor 880, may also be self-biased to another signal or node from within the charge pump 800. In one exemplary aspect, a node associated with one of the transistors 880, 882 may be coupled to an output node 852 of a pump stage one stage later or to an input node 861 of a pump stage two stages later. This self-biased node may be, according to one exemplary aspect, a diode-connected node 884 of a transistor 880 within the precharging circuitry 826. As with the self-biased interconnections described above, such biased coupling are implemented to provide self-biased circuits 826 that are electrically connected to another node within the charge pump 800 to associated circuitry, nodes and/or desired signal levels. As such, the circuit of FIG. 8 may provide self-bias precharge (self-precharging) features and/or self-biased buffering or breakdown preventing features. For example, self-biased transistors 880 may buffer a transistor 882 in series to prevent breakdown conditions of associated components, such as high voltage breakdown of the adjacent transistor, by biasing its gate to a bias voltage proscribed by the internal coupling. The number of transistors 880,882 in series may be such that, at steady state, the output voltage 852 does not interfere with the node 821. Thus, again, the self-biased circuitry here are coupled to intermediate reference voltages to buffer associated circuitry and nodes against the deleterious breakdown effects of adjacent circuits, and, in the meantime, may also provide precharging level to internal pumped nodes.

Figure 9A:
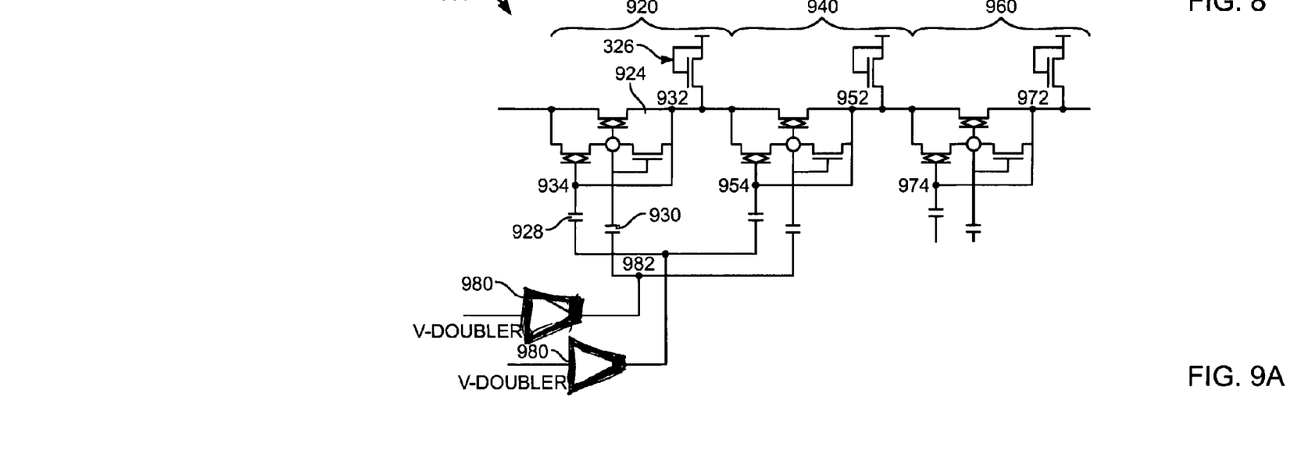
FIG. 9A is a schematic diagram illustrating a charge pump consistent with one or more aspects related to the innovations herein.
Figure 9B:
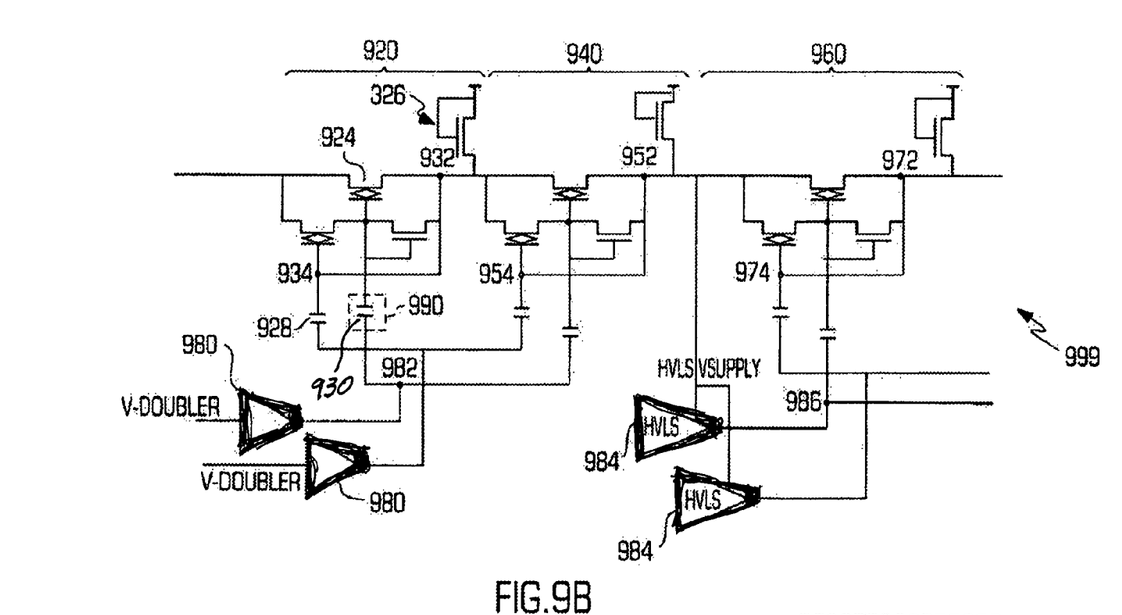
FIG. 9B is a schematic diagram illustrating a circuit used in a charge pump consistent with one or more aspects related to the innovations herein.
Figure 9C:
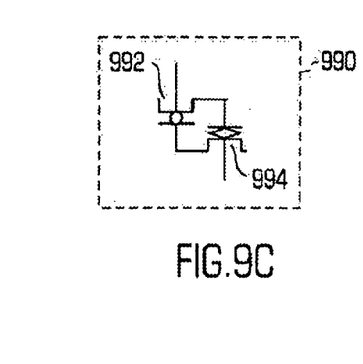
FIG. 9C is a schematic diagram illustrating a circuit used in a charge pump consistent with one or more aspects related to the innovations herein.

FIGS. 9A-9C are schematic diagrams illustrating charge pumps 900, 999 consistent with one or more aspects related to the innovations herein. The features set forth in FIGS. 9A-9C may be implemented in connection with the other charge pumps and circuits disclosed throughout, while other aspects of the innovations herein may also be combined with these charge pumps 900, 999. The charge pumps 900, 999 of FIGS. 9A and 9B may include pump stages 920, 940, 960 with components such as precharge circuits 326, transistors 924, nodes 932, 952, 972, 934, 954, 974, and capacitors 928, 930, as set forth above. Moreover, charge pumps 900, 999 may also include one or more of voltage doublers 980, high voltage level shifters 984, and/or anti-parallel components 990.

For example, the charge pump 900 of FIG. 9A may include one or more voltage doublers 980 for driving the capacitance of capacitors 928, 930 to increase available voltage level to provide desired charge/discharge features to one or more pump stages 920, 940, 960. As such, a voltage available as output from a voltage doubler may be doubled the available power supply VDD and used on a node 982 within a pump stage or between pump stages 920, 940. By use of the voltage doubler 980, a voltage swing of the associated capacitors/stage, then, will be doubled, driving the pumping capacitances accordingly, and with all of the associated benefits and drawbacks being increased and decreased, respectively. The pumped voltage associated with the voltage doubler will be doubled at the expense of additional circuitry of the voltage doubler. The voltage doubler is especially critical at the first few stages to enable more effective precharging, since the precharged level at the first few stages is typically low (VDD–$V_{TN}$). Similarly, one or more pump stages may also include high voltage level shifters 984 to perform similar capacitance/phase driving and shifting of voltage levels, thereby charging and/or discharging the pump stages more effectively, in accordance therewith. For example, as shown in FIG. 9B, a high voltage level shifter 984 may take a voltage available from an output node 952 of a previous stage and shift it to a higher voltage level for use on a node 986 within an associated pump stage 960. According to certain aspects, one or more of the high voltage level shifters 984 may be coupled to a stage that is above (i.e., pumped to a higher voltage) than the stage associated with the voltage doubler. According to further aspects, a charge pump may include voltage doublers coupled to an initial group of two or more pump stage stages, and high voltage level shifters coupled to one or more stages that are not coupled to the voltage doublers.

Turning to FIG. 9C, as expanded from FIG. 9B, a charge pump may also include an anti-parallel component 990 that help drive a charge pump component, such as a pump stage, node, etc., during a low voltage condition. According to one aspect, the anti-parallel component 990 may include an anti-parallel capacitor circuit or configuration. As shown in FIG. 9C, such an anti-parallel component 990 may include a PMOS transistor and an native NZMOS transistor, with a gate of the PMOS transistor being coupled to a source or a drain of the NZMOS transistor, and a gate of the NZMOS transistor being coupled to a source or a drain of the PMOS transistor.

Figure 10:
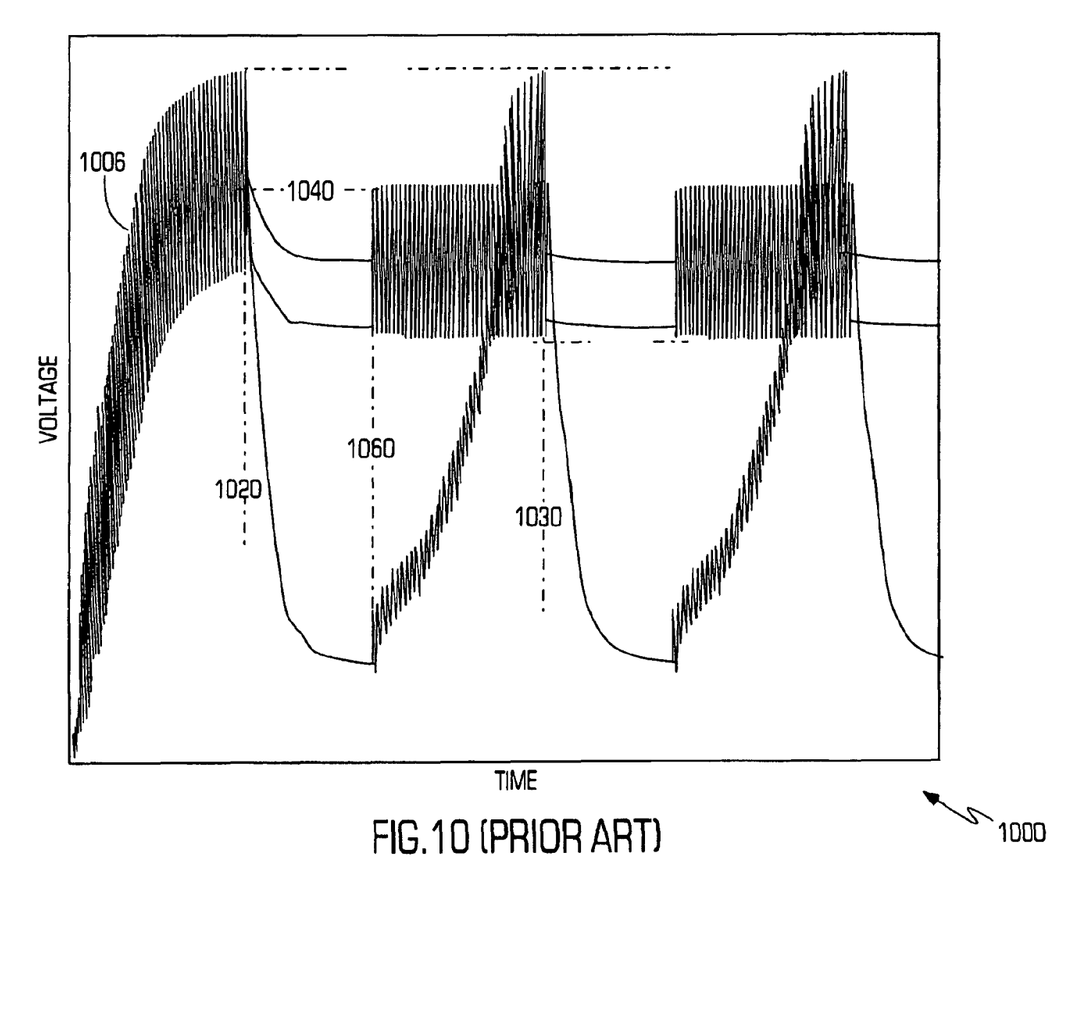
FIG. 10 is a graph illustrating waveforms of internal nodes at stable operation of a prior art charge pump.
Figure 11:
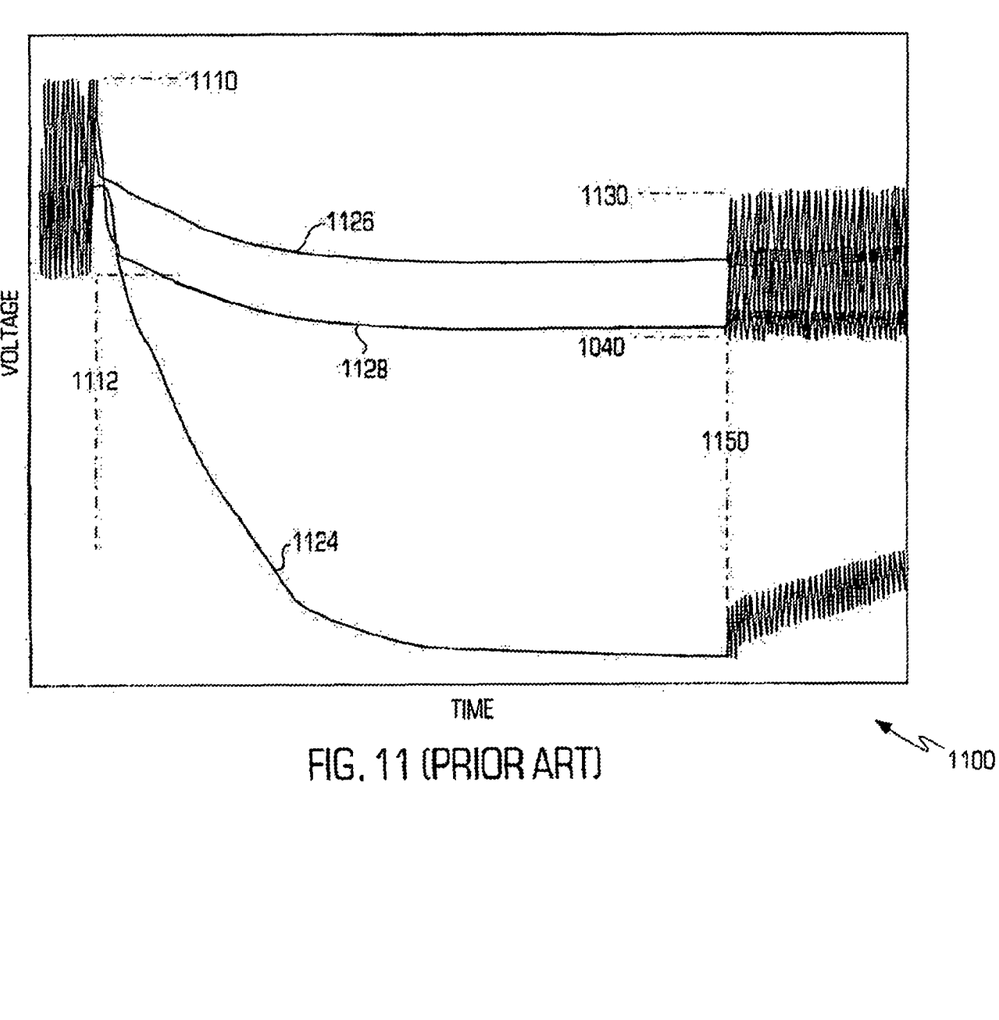
FIG. 11 is a graph illustrating waveforms of internal nodes at stable operation of a prior art charge pump.
Figure 12:
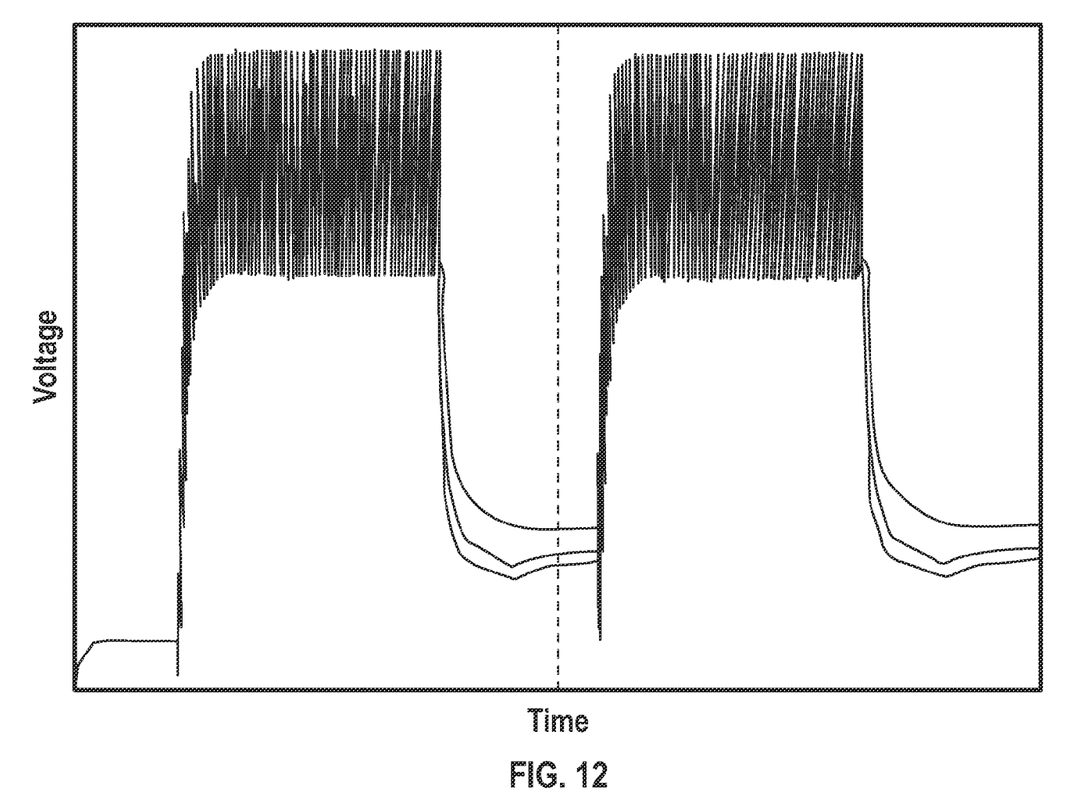
FIG. 12 is a graph illustrating waveforms of internal nodes at stable operation, consistent with one or more aspects related to the innovations herein.
Figure 13:
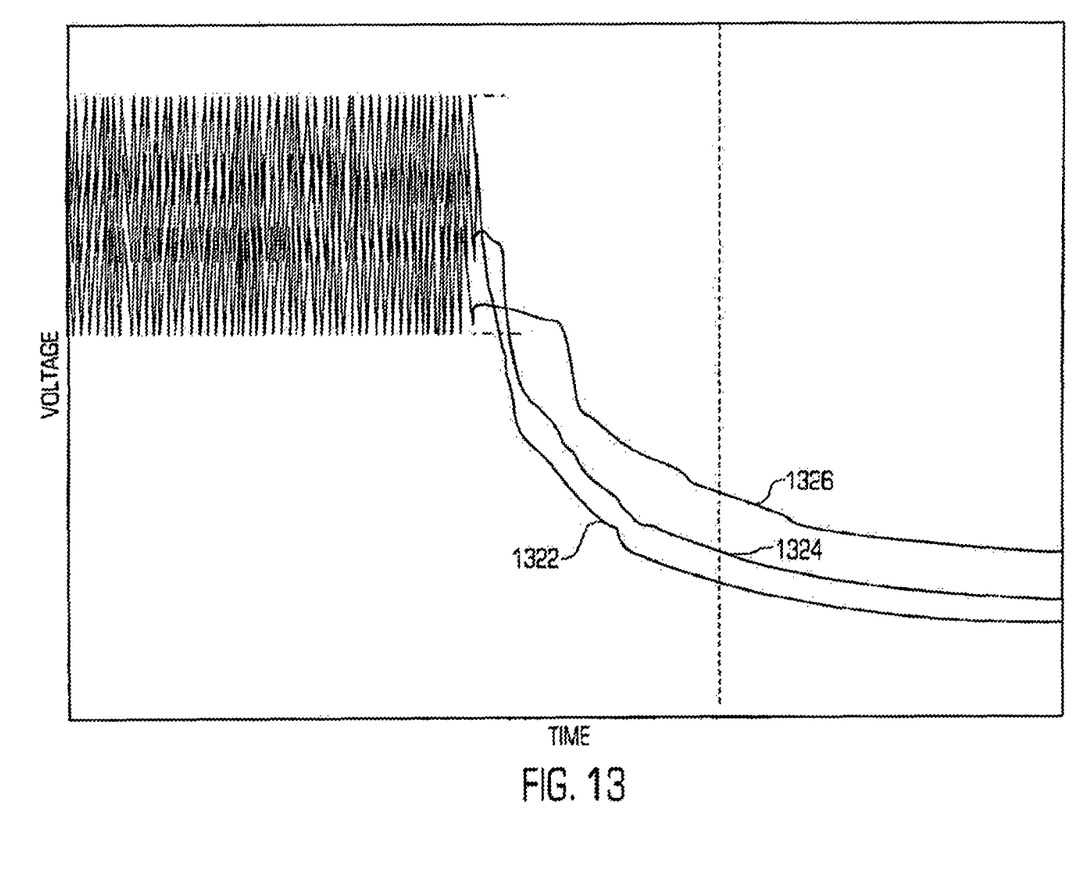
FIG. 13 is a graph illustrating waveforms of internal nodes at stable operation, consistent with one or more aspects related to the innovations herein.

FIGS. 10-13 are graphs illustrating waveforms of internally pumped nodes at stable operating points. Waveforms of known charge pumps (FIGS. 10 and 11) are contrasted with those of charge pumps consistent with one or more aspects related to the innovations herein (FIGS. 12 and 13). In general, as seen in the graph 1000 of FIG. 10, a first output node may initially ramp up 1006 and then be discharged at a first discharge time 1020. Another node is shown as charging at a second time 1060, to specified voltage output level 1040. Both nodes are shown as charged or charging as a second discharge time 1030 approaches. The graph 1100 of FIG. 11 shows an output node 1124, and a supplemental node 1128 within the pump stage associated with the output node 1124. Voltage on a third node 1126 is also shown, with this third node 1126 being a supplemental node from a previous pump stage. In FIG. 11, a first pumping period is marked as ending at a first time 1112, a second pumping period begins at a second time 1150, and a discharge period (i.e., where output nodes are discharged) is that which occurs in between. As shown, as node 1124 goes down to a low level via a discharge circuit couples to the output node, nodes 1128 and 1124 still stay at high voltages. This may cause internal 'output nodes' of adjacent stages to be coupled or shorted together, which may produce one or more adverse effects. For example, in the next pumping period, the voltages either may not reach as high of levels (e.g., levels 1110 and 1130 of FIG. 11; see, also FIG. 10), and/or they may take longer times to reach stable DC operating points (FIG. 10). In contrast, FIGS. 12 and 13 illustrate charge pump nodes consistent with one or more aspects related to the innovations herein. Both FIG. 12 and FIG. 13 show all output nodes going down to low levels, and in the next pumping period, normal voltage rise and waveform shape consistent with the first/earlier and desired waveforms. As shown in FIG. 13, a final output node 1322 discharge first, followed by earlier output nodes 1324, 1326, successively back down the charge pump.

In the foregoing description, various methods and apparatus, and specific embodiments are described. However, it should be obvious to one conversant in the art, various alternatives, modifications, and changes may be possible without departing from the spirit and the scope of the invention which is defined by the metes and bounds of the appended claims.

We claim:
1. The charge pump comprising:
  a plurality of pump stages arranged in successive stages, including stage N and a plurality of stages prior to N, each pump stage of the plurality of pump stages including an output node, a first node, a first transistor coupled between an input node and the first node, and a second transistor coupled between the output node and the first node;
  wherein the second transistor of stage N is coupled to a different stage, before or after stage N, of the pump stages arranged in successive stages to acquire a reference voltage used to discharge the first node;
  wherein each pump stage has a precharge circuit associated therewith; and
  wherein at least one of the precharge circuits of stage N or a stage after stage N includes a third transistor and a fourth transistor, with a gate of the third transistor or the fourth transistor being coupled to a second node of another pump stage of the pump stages arranged in suc- cessive stages to provide self-biased buffering to prevent high voltage breakdown of a transistor in the precharge circuit.

2. The charge pump of claim 1, wherein the second transistor is coupled to the first node of the different stage.

3. The charge pump of claim 1, wherein a gate of the second transistor is coupled to the first node of the different stage.

4. The charge pump of claim 1, wherein, in each pump stage, a gate of the first transistor and a source or drain of the second transistor are coupled to a reference node.

5. The charge pump of claim 1, wherein the second transistor is an NMOS transistor.

6. The charge pump of claim 1, wherein the second transistor is a native NMOS transistor.

7. The charge pump of claim 1, wherein the different stage is one stage earlier than stage N.

8. The charge pump of claim 1, wherein the different stage is two stages earlier than stage N.

9. The charge pump of claim 7, wherein the second transistor is coupled to a reference node of the different stage.

10. The charge pump of claim 7, wherein a gate of the second transistor is coupled to a reference node of the different stage.

11. The charge pump of claim 7, wherein, in each pump stage, a gate of the first transistor and a source or drain of the second transistor are coupled to a reference node.

12. The charge pump of claim 7, wherein the second transistor is an NMOS transistor.

13. The charge pump of claim 7, wherein the second transistor is a native NMOS transistor.

14. The charge pump of claim 1, wherein the second node of the another stage is the input node or the output node of the another stage.

15. The charge pump of claim 1, wherein the third transistor and the fourth transistor are coupled in series.

16. The charge pump of claim 1, wherein the another pump stage is one stage earlier than stage N.

17. The charge pump of claim 1, wherein the another pump stage is two stages earlier than stage N.

18. The charge pump of claim 14, wherein the second transistor is coupled to the first node of the different stage.

19. The charge pump of claim 16, wherein a gate of the second transistor is coupled to the first node of the different stage.

20. The charge pump of claim 16, wherein, in each pump stage, a gate of the first transistor and a source or drain of the second transistor are coupled to a reference node.

* * * * *